United States Patent [19]

Okuda et al.

[11] 4,136,158
[45] Jan. 23, 1979

[54] PRODUCTION OF ACICULAR MAGNETIC IRON OXIDES

[75] Inventors: Yosiro Okuda; Nanao Horiishi; Hiroshi Sumita; Tosiharu Harada, all of Hiroshima, Japan

[73] Assignee: Toda Kogyo Corp., Hiroshima, Japan

[21] Appl. No.: 847,446

[22] Filed: Nov. 1, 1977

[30] Foreign Application Priority Data

| Nov. 1, 1976 [JP] | Japan | 51-131849 |
| Nov. 4, 1976 [JP] | Japan | 51-133636 |
| Dec. 15, 1976 [JP] | Japan | 51-151385 |
| Dec. 18, 1976 [JP] | Japan | 51-152677 |

[51] Int. Cl.² .................................. C01G 49/02
[52] U.S. Cl. .............................. 423/632; 423/633; 423/634
[58] Field of Search ............... 423/632, 633, 634, 140; 252/62.56

[56] References Cited

U.S. PATENT DOCUMENTS

| 3,912,646 | 10/1975 | Leitner et al. | 423/634 |
| 3,931,025 | 1/1976 | Woditsch et al. | 423/634 |
| 3,947,502 | 3/1976 | Leitner et al. | 432/634 |
| 3,956,005 | 5/1976 | Sugahara et al. | 106/308 B |
| 3,974,079 | 8/1976 | Woditsch et al. | 252/62.56 |

Primary Examiner—O. R. Vertiz
Assistant Examiner—Wayne A. Langel
Attorney, Agent, or Firm—Oblon, Fisher, Spivak, McClelland & Maier

[57] ABSTRACT

In the production of acicular ferromagnetic iron oxide of highly uniform particle size by oxidizing an iron (II) hydroxide suspension at a pH of at least 11 with an oxygen-containing gas to form acicular iron (III) oxide hydroxide, reducing and optionally further reoxidizing this into ferromagnetic iron oxide, the improvement which comprises providing the iron (II) hydroxide suspension with a water-soluble silicate in an amount of less than 1.7% by atom based on the amount of the iron (II) hydroxide in the suspension and calculated as the ratio of Si to Fe (II) while prior to the oxidation of the suspension with the oxygen-containing gas.

17 Claims, 22 Drawing Figures

FIG. 1a
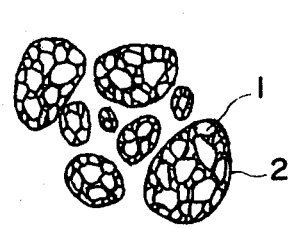
FIG. 1b
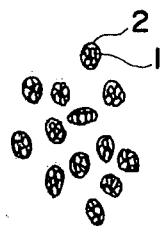
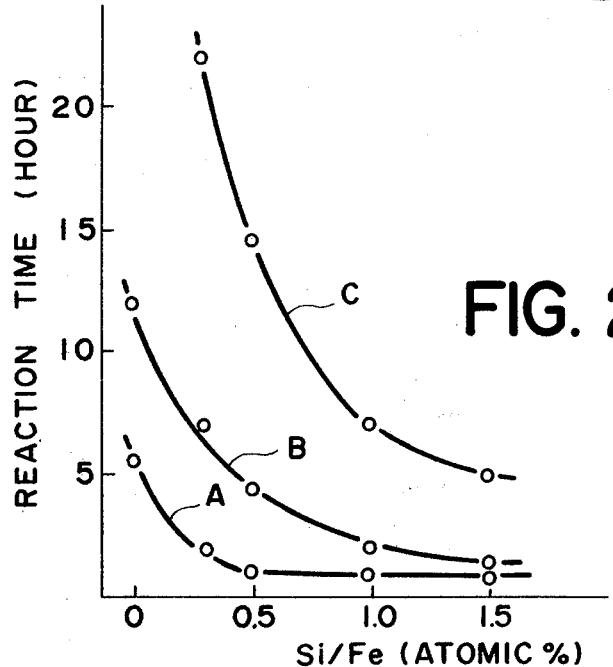
FIG. 2a
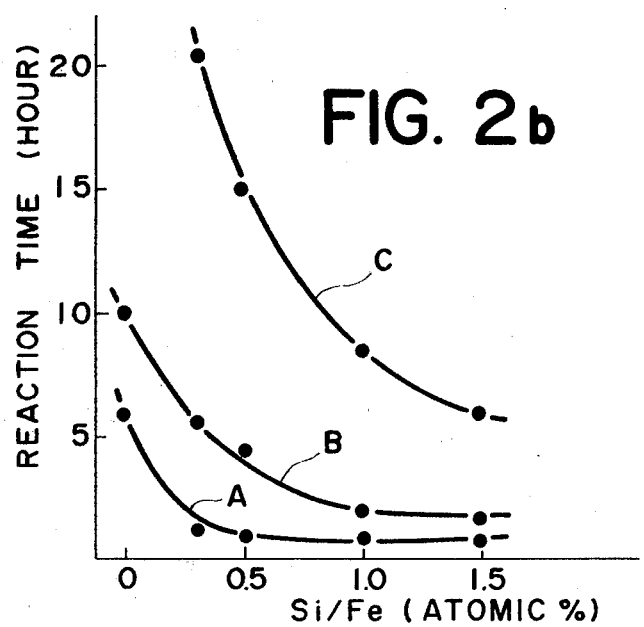
FIG. 2b

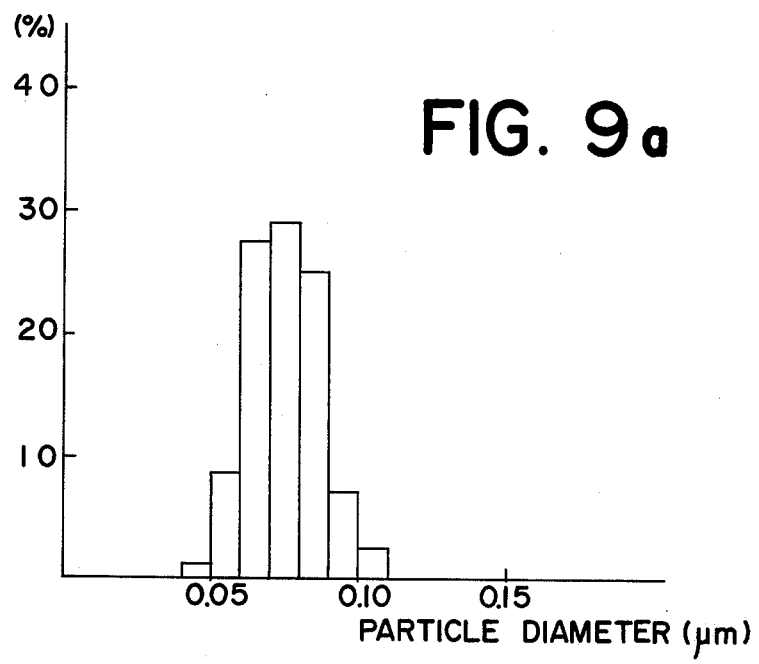
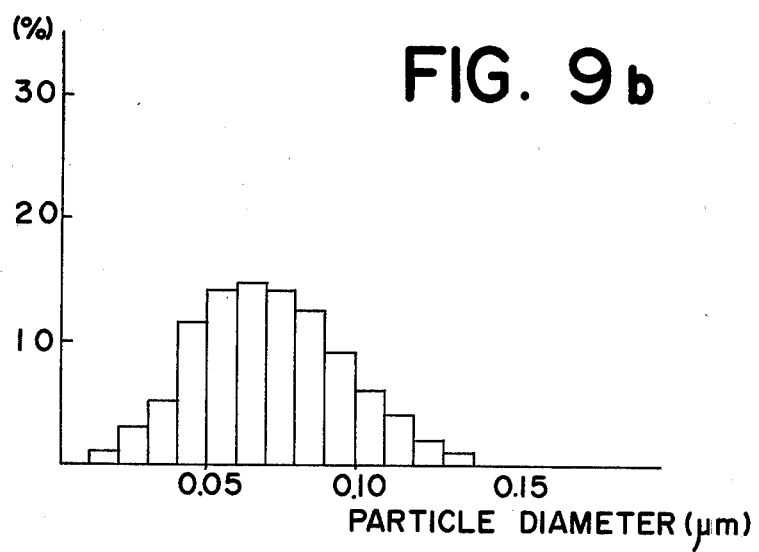

(X 20 000)

(X 20 000)

(X 20 000)

PRODUCTION OF ACICULAR MAGNETIC IRON OXIDES

BACKGROUND AND SUMMARY OF THE INVENTION

This invention relates to improved processes for the production of acicular, ferromagnetic iron oxides of highly uniform particle size and magnetic characteristics suitable for use in magnetic recording medium.

In recent years, a demand for a high quality of magnetic recording media including magnetic tape, magnetic disc, et al., has been more and more increasing with the progress of miniaturization and lightening of reproducing apparatuses for magnetic recording. To be specific, magnetic recording media of higher bit density, higher output, higher sensitivity and improved frequency characteristics et al., has been requested. These magnetic properties of magnetic recording media are mainly influenced by their residual magnetic flux density Br, while the residual magnetic flux density Br is strongly influenced by properties of the magnetic powder such as their dispersiveness in a vehicle, their orientation and packing property in a coating medium. Iron oxide needles such as acicular magnetite powder and acicular maghemite powder used nowadays as a main magnetic recording material is usually prepared in such a manner that acicular α—FeO(OH) is reduced in a stream of a reducing gas such as $H_2$ at a temperature of 300° C.–400° C. to produce acicular magnetite powder, or thereafter the produced acicular magnetite powder is re-oxidized at a temperature of 200° C.–300° C. in the air to produce acicular maghemite powder.

The starting acicular α—FeO(OH) is prepared by, as a typical manner, adding more than equivalent of an alkaline aqueous solution to an aqueous solution of ferrous salt to produce an aqueous suspension containing precipitated $Fe(OH)_2$, and thereafter oxidizing the obtained suspension at a pH of more than 11 and at a temperature of less than 80° C. The acicular α—FeO(OH) thus obtained is in a form of needles having a length of about 0.5–1.5μm while dendoroidal particles are inevitably included therein, and further their particle size can not be said to be uniform.

These difficulties are brought about in the conventional process by reason that:

A. Ferrous hydroxide floccules, the precursor of the acicular α—FeO(OH) needles, contained in a flocculated form in the iron (II) hydroxide suspension originally have non-uniform floc-size. Further, it should be noted that iron (II) hydroxide particles per se forming each floccule also have non-uniform particle size which contributes to the formation of the acicular α—FeO(OH) needles having non-uniform particle size.

B. In general, the reaction for producing the acicular α—FeO(OH) needles comprises two reaction steps, namely, the first generation step of α—FeO(OH) nuclei and the second growth step of the α—FeO(OH) nuclei to the needles through the contact of $Fe(OH)_2$ with the dissolved oxygen.

However, as the contact reaction of $Fe(OH)_2$ with the dissolved oxygen is performed only partially and unevenly, the α—FeO(OH) nuclei generation step and the growth step thereof to the needles occur simultaneously and new nuclei of the α—FeO(OH) are repeatedly generated until the production of the α—FeO(OH) needles is completed.

Thus, owing to these facts, it is considered that the acicular α—FeO(OH) needles having irregular particle sizes and including dendroidal particles are inevitably produced.

C. The concentration of reactant Fe(II) in the aqueous suspension according to the conventional process is usually about 0.2 mol/l while the formation of the acicular α—FeO(OH) needles requires long reaction times. That is, in the conventional process, the particle size of the resultant α—FeO(OH) needles is not uniform even at a Fe(II) concentration of as low as about 0.2 mol/l. On the other hand, it is well known that as the concentration of the reactant Fe(II) becomes larger, the more dendroidal particles come to be mixed in. Accordingly, the acicular magnetite needles or the acicular maghemite needles prepared by the reduction and reoxidation of the starting acicular α—FeO(OH) prepared by the conventional process is also uneven in particle size thereof and contaminated with the dendroidal particles. Of course, the magnetic recording medium made of such magnetic material as low quality in powder characteristics can not provide high Br values. Under the foregoing situations in the art, many efforts have been made in the prior art for preparing starting acicular α—FeO(OH) of high quality having uniform particle size and not contaminated with dendroidal particles.

For example, in Japanese Patent Laying Open No. 57397/74 disclosed is a process for preparing α—FeO(OH) particles in which an aqueous solution of ferrous salts is allowed to react with an alkaline aqueous solution to produce a precipitated $Fe(OH)_2$ suspension which thereafter is stirred by means of a stirrer or supersonic waves for several hours under a non-oxidative condition to produce colloidal, white-milky and finely dispersed $Fe(OH)_2$ precipitates and then to form α—FeO(OH) needles by an oxidative reaction with the air or an oxygen-containing gas.

In Japanese Patent Laying Open No. 867695/76 disclosed is a process in which a white precipitate of $Fe(OH)_2$ in a gel form is oxidized while an oxygen-containing gas is being introduced in an amount of less than 100 cc/min. calculated as the ratio of pure oxygen per 0.5 molar $Fe(OH)_2$. In this process, the white precipitate of $Fe(OH)_2$ in a gel form is oxidized very slowly and whereby it is intended to obtain acicular α—FeO(OH) including less dendroidal particles and having more uniform particle size.

Further, in Japanese Patent Laying Open No. 57996/75 disclosed is a process for preparing acicular α—FeO(OH) particles of superior acicularity and having uniform particle size, in which seeds of α—FeO(OH) are formed at a pH of 2–8 and under the presence of about 0.1–4% by weight of zinc ion and about 0.1–2% by weight of phosphate ion based on the amount of α—FeO(OH) to be precipitated.

On the other hand, in U.S. Pat. No. 3,947,502 and Japanese Patent Laying Open Nos. 83100/73 and 41299/74 disclosed is a process for improving stabilization of the acicular α—FeO(OH) against sintering by coating the α—FeO(OH) needles with $SiO_2$, which includes the step of effecting the oxidation of the iron (II) hydroxide suspension at a pH of at least 13, before the oxidation is more than 95% complete but after the oxidation is more than 50% complete $SiO_2$ being present in the suspension in the form of a sol or soluble salt, the resulting iron (III) oxide hydroxide having $SiO_2$ deposited thereon.

However, although the α—FeO(OH) needles having SiO$_2$ deposited thereon prepared according to the above process are prevented from sintering during the heat treatment thereof, the uniformity of particle size of the needles themselves is not in the least improved.

Accordingly, an object of this invention is to provide an improved process for preparing iron oxide needles such as acicular magnetite and maghemite having highly uniform particle size and being not contaminated with dendroidal particles, and suitable for use in magnetic recording medium.

Another object of this invention is to provide an improved process for preparing iron oxide needles having uniform particle size and also large length-to-width ratio to be required.

These and other objects of this invention will become more apparent from the following description.

The foregoing and other objects of this invention will be accomplished by the process of this invention in which the formation of acicular iron (III) oxide hydroxide (α—FeO(OH)) as starting material is carried out by previously adding a critical amount of water-soluble silicate and preferably water-soluble zinc compound into an iron (II) hydroxide (Fe(OH)$_2$) suspension at a pH of at least 11 and thereafter oxidizing the iron (II) hydroxide suspension with an oxygen-containing gas.

BRIEF DESCRIPTION OF THE DRAWINGS

Both FIGS. 1-*a* and -*b* are schematic explanatory views illustrating conditions of flocked Fe(OH)$_2$, more specifically, FIG. 1-*a* shows those prepared by a conventional manner and FIG. 1-*b* shows those prepared according to the present invention;

FIGS. 2-*a* and -*b* illustrate the relation between the added amount of water-soluble silicate and the reaction times required for the production of acicular α—FeO(OH) needles;

Figure 8:
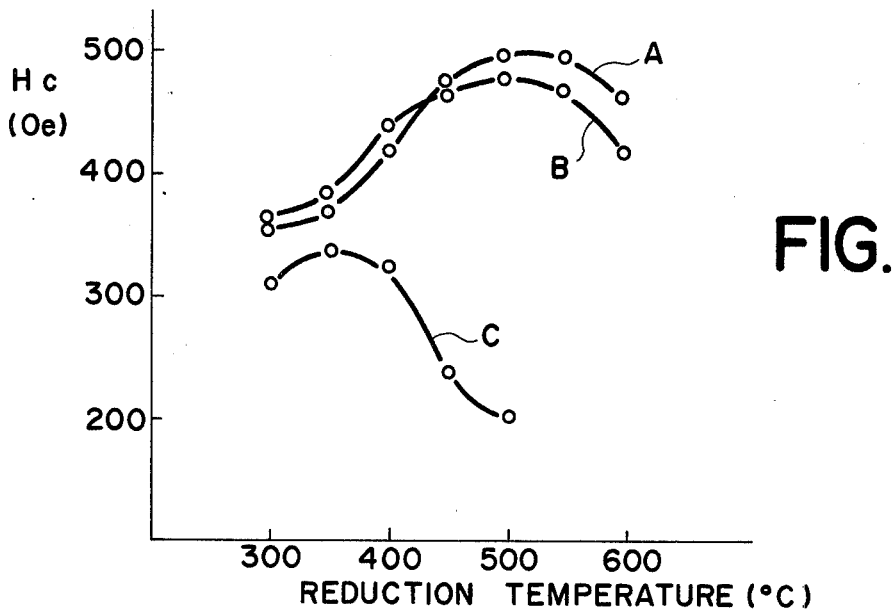
FIG. 8 shows the relation between the reduction temperatures in H$_2$ gas stream and the coercive force Hc of the resulted acicular maghemite powder.
Figure 10A:
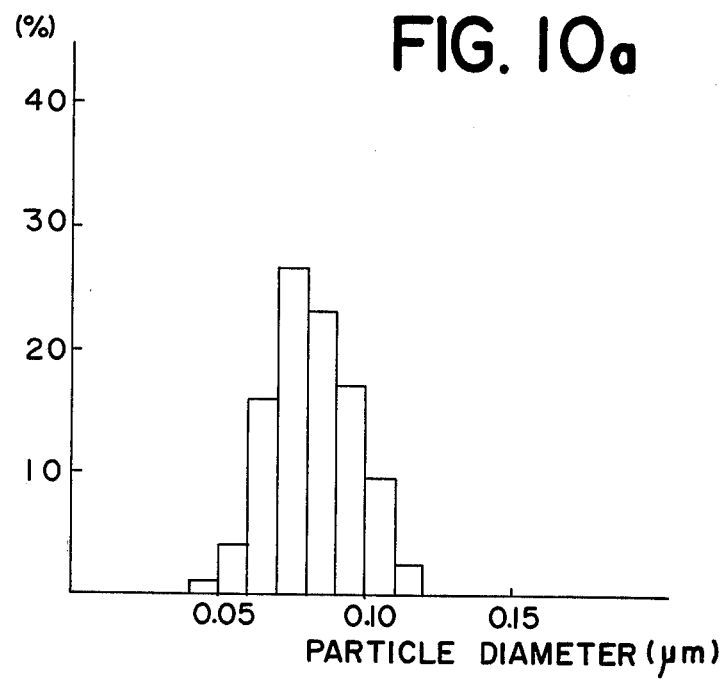
Figure 10B:
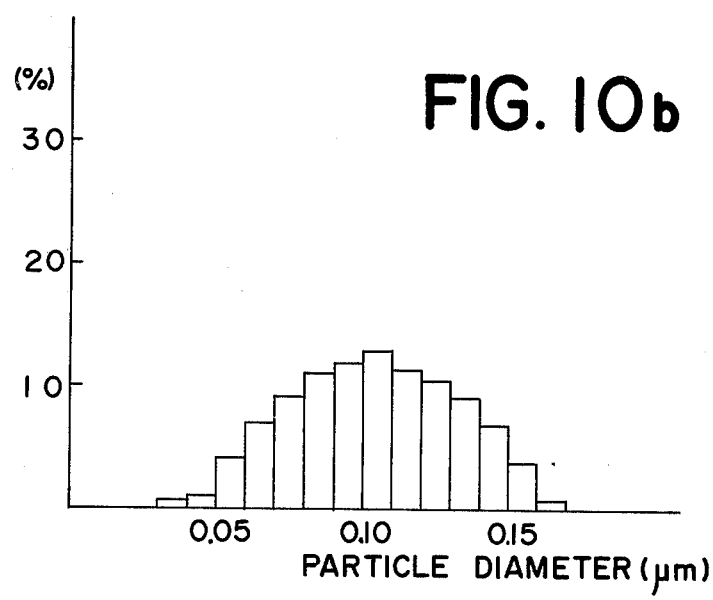
Figure 11:
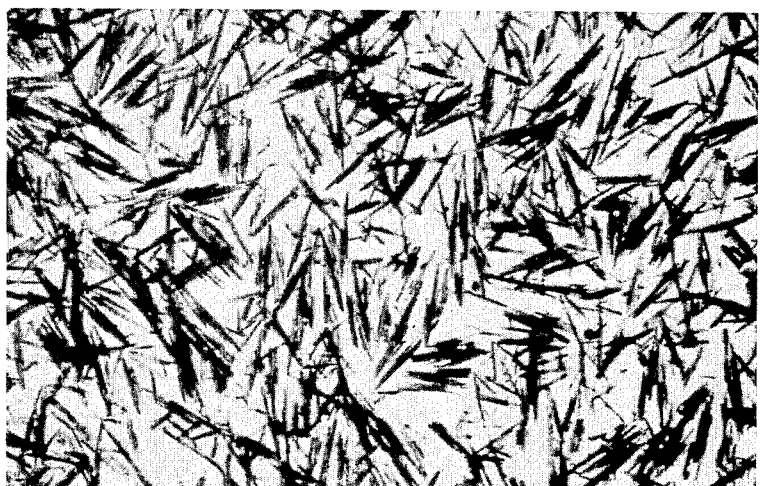
Figure 12:
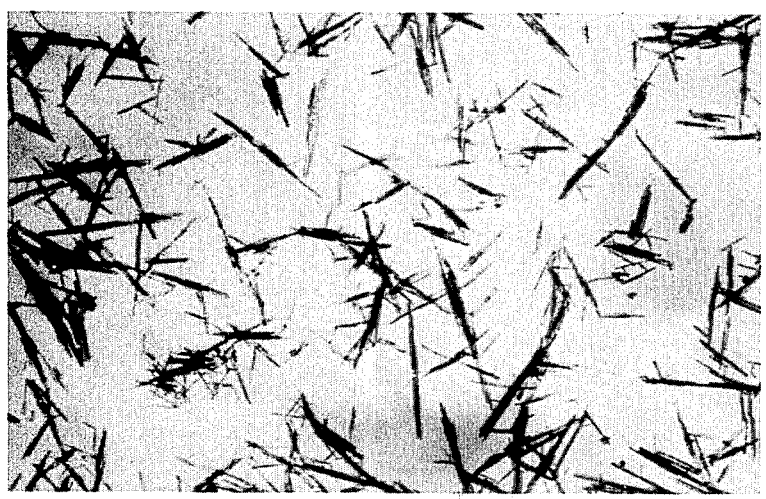
Figure 13:

The starting materials for each of curves A, B and C in FIG. 8 are the acicular α—FeO(OH) powder obtained in Example 1, Example 14, and Comparison Example 1 respectively;

FIGS. 9-*a* and -*b* illustrate the particle size distribution of the acicular α—FeO(OH) powder, more specifically, FIG. 9-*a* shows the acicular α—FeO(OH) powder prepared according to the present invention (Example 1), and FIG. 9-*b* shows the acicular α—FeO(OH) powder prepared by the conventional process (Comparison Example 1);

FIGS. 10-*a* and -*b* illustrate the particle size distribution of the acicular maghemite powder, more specifically, FIG. 10-*a* shows the acicular maghemite powder prepared according to the present invention (Example 87) and FIG. 10-*b* shows the acicular maghemite powder prepared by the conventional process (Comparison Example 14);

FIGS. 11 to 13 are electron photomicrographs taken at a magnification of 20,000× to show the particles of the α—FeO(OH), and specifically, FIG. 11 shows acicular α—FeO(OH) powder prepared in Example 9 according to the present invention, FIG. 12 shows α—FeO(OH) powder prepared in Comparison Example 4, and FIG. 13 shows acicular maghemite powder prepared in Example 95 according to the present invention.

DETAILED DESCRIPTION

In accordance with one feature of the present invention, water-soluble silicate added to the Fe(OH)$_2$ suspension is found to exhibit a characteristic action to finely divide the floccules of Fe(OH)$_2$ precipitate in the suspension and homogenize the floc-size thereof. Further, surprisingly it has been found that when the Fe(OH)$_2$ precipitate suspension containing Fe(OH)$_2$ floccules of finely divided, uniform floc-size thus prepared is oxidized by an oxygen-containing gas, Fe(OH)$_2$ and the dissolved oxygen are very effectively contacted with each other thereby extremely shortening the total reaction time required for the production of the acicular α—FeO(OH) needles in comparison with that in the case of the conventional process, whereas the finally obtained needles include no dendroidal particles and have highly uniform particle size. This fact indicates that while the production of the acicular α—FeO(OH) is taking place, the nucleation (formation of seeds) of the acicular α—FeO(OH) and the growth of the nuclei (seeds) into large needles do not occur parallelly but progress by gradation.

In other words, a very slight amount of silicate anions coexisting in the Fe(OH)$_2$ suspension performs an action to temporarily depress an initial reaction during the production of the acicular α—FeO(OH), and so the silicate anions can be regarded as an "inhibitor" which provides so called an "induction period" with respect to the subject chemical reaction, as is defined in the field of the chemical reaction kinetics.

Therefore, it is critically important to determine an upper limit of the amount of the water-soluble silicate to be added as an "inhibitor" in the process according to the present invention.

Results of many experiments strictly performed by the inventor of the present invention show that the critical upper limit of the amount of the water-soluble silicate is 1.7% by atom calculated as the ratio of Si to the entire Fe (II) contained in the Fe(OH)$_2$ suspension (hereinafter referred to as simply "Si/Fe(II)"). As a matter of fact, if the water-soluble silicate is added to the Fe(OH)$_2$ suspension in an amount exceeding this critical upper limit, the whole oxidation reactions during the production of the acicular α—FeO(OH) needles are suppressed, and as a result, it can hardly be avoided that the final products include unfavorable granular magnetite (Fe$_3$O$_4$) particles caused by inefficient oxidation.

Incidentally, it may be obvious that in the process according to the present invention, the water-soluble silicate must be added strictly before starting the oxidation of the Fe(OH)$_2$ suspension with an oxygen-containing gas. This is because the nucleation (formation of seeds) of α—FeO(OH) takes place at an early stage of the oxidation as aforementioned, and therefore if the water-soluble silicate is added after the oxidation is already started, it does not contribute to the homogenization of the final acicular α—FeO(OH) needles. Therefore, in this viewpoint too, it will be apparent that the process according to the present invention is clearly different from the process disclosed in U.S. Pat. No. 3,947,502 et al., as mentioned above.

In accordance with one of the other features of the present invention, it has been found that if a water-soluble zinc compound in addition to the water-soluble silicate is added to the Fe(OH)$_2$ suspension prior to the oxidation thereof for the formation of the acicular α—FeO(OH) needles, the axial ratio (long axis to short axis) of the produced needles is exceedingly improved while without hampering the characteristic actions of the water-soluble silicate.

As is well known, in order to modify the nature of the ferromagnetic iron oxides, various different kinds of metal elements have been introduced into the lattice of the ferromagnetic iron oxides.

However, according to the best knowledge of the present inventors, metal ions other than the Zn ion show an unexpectedly negative action to remarkably hinder the characteristic actions of the water-soluble silicate as mentioned above.

Therefore, it is another subject of the present invention to use a predetermined amount of water-soluble zinc compound in combination with the water-soluble silicate for the formation of the acicular α—FeO(OH) needles.

The conditions and effects of the addition of the Zn ion will be detailed hereinafter. Referring now to the attached drawings, the effects provided by the addition of the water-soluble silicate and a Zn compound according to the present invention will be described in detail hereinafter.

FIG. 1-a and FIG. 1-b are schematic views illustrating Fe(OH)$_2$ floccules in the Fe(OH)$_2$ precipitate suspension.

In the present invention, the water-soluble silicate may be added either to an alkaline aqueous solution before forming Fe(OH)$_2$ by the reaction with an aqueous Fe (II) salt solution, or after the formation of Fe(OH)$_2$. In either case, the water-soluble silicate transforms the uneven floccules of Fe(OH)$_2$ into finely divided homogeneous one. Fe(OH)$_2$ precipitate prepared by the reaction of an aqueous Fe (II) salt solution with an aqueous alkaline solution is considered to be in the condition shown by the schematic enlarged view as illustrated in FIG. 1-a. The Fe(OH)$_2$ particles (indicated as 1 in FIG. 1-a) are flocculated to form flocs (indicated as 2 in FIG. 1-a) of various different sizes, which, when viewed microscopically, comprise (Fe(OH)$_2$ particles of nonhomogeneous particle size. When the water-soluble silicate is previously added to the alkaline aqueous solution, the water-soluble silicate contributes to the formation of Fe(OH)$_2$ having fine and uniform floc-size (indicated as 2 in FIG. 1-b) and also comprising fine and uniform Fe(OH)$_2$ particles (indicated as 1 in FIG. 1-b).

FIG. 2 shows the relationship between the added amount of the water-soluble silicate and the reaction times required for the production of the acicular α—FeO(OH) particles. FIG. 2-a shows the case wherein the water-soluble silicate is added to an alkaline aqueous solution, while FIG. 2-b shows the case wherein the water-soluble silicate is added to an aqueous Fe(OH)$_2$ suspension before the oxydation thereof.

More specifically, shown in FIG. 2-a is the relationship between the reaction times required for the formation of the acicular α—FeO(OH) needles and the amount of the water-soluble silicate contained in a Fe(OH)$_2$ suspension at a pH of 13.3 which is prepared by mixing an aqueous ferrous sulfate solution of a fixed Fe (II) concentration with an aqueous NaOH solution containing the water-soluble silicate in the range of 0.3–1.5% by atom based on the amount of Fe(OH)$_2$ in the suspension to be formed and calculated as the ratio of Si to Fe (II).

The α—FeO(OH) needles is prepared by oxidizing the Fe(OH)$_2$ suspension with introduction of 20l of air per minute at a temperature of 45° C.

Curved lines A, B and C in FIG. 2-a correspond to the Fe (II) concentrations of 0.3 mol/l, 0.4 mol/l and 0.7 mol/l respectively.

In regard to FIG. 2-b, shown is the relationship between the reaction times required for the production of the acicular α—FeO(OH) particles and the added amount of the water-soluble silicate contained in a Fe(OH)$_2$ suspension at a pH of 13.1 which is prepared by mixing an aqueous ferrous sulfate solution of a fixed Fe (II) concentration with an aqueous NaOH solution and thereafter adding water-soluble sodium silicate thereinto in an amount between 0.3 and 1.5% by atom calculated as the ratio of Si to Fe (II).

The resultant Fe(OH)$_2$ suspension is oxidized to form α—FeO(OH) needles by introducing thereinto 20l of air per minute at a temperature of 45° C.

Curved lines A, B and C in FIG. 2-b correspond to the reactant Fe (II) concentrations of 0.3 mol/l, 0.4 mol/l and 0.7 mol/l respectively.

As is apparent from FIG. 2, at each iron (II) concentrations of 0.3 mol/l, 0.4 mol/l and 0.7 mol/l, the reaction times required for the production of the acicular α—FeO(OH) particles are extremely shortened with the increase of the added amount of the water-soluble silicate.

In other words, in spite of the Fe (II) concentration, pH, reaction temperature and the amount of the introduced air being fixed, the reaction times required for the production of the acicular α—FeO(OH) needles extremely shortened with the increase of the added amount of the water-soluble silicate because the Fe(OH)$_2$ flocs and the dissolved oxygen are very efficiently contacted to each other. This fact is considered to indicate that with the increase of the added amount of the water-soluble silicate, the Fe(OH)$_2$ floccules may be finely divided and homogenized. Especially, in the case of FIG. 2-a, not only the floccules but also Fe(OH)$_2$ particles constituting the floccules may be finely divided and homogenized.

Figure 3A:
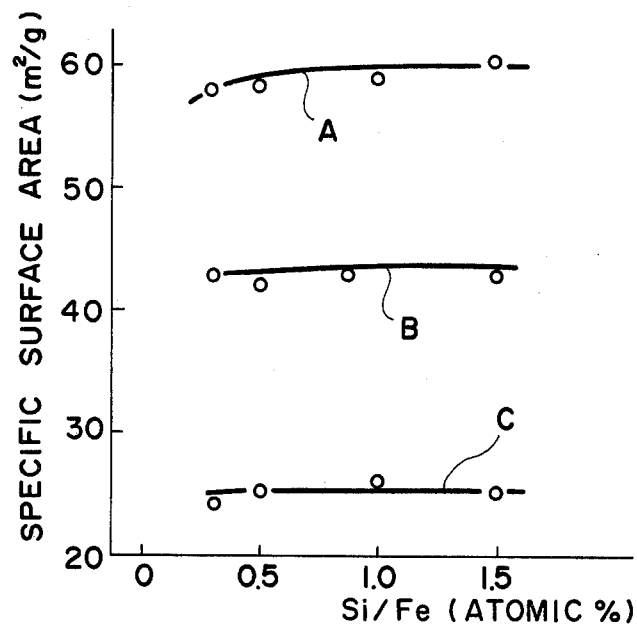
FIGS. 3-*a* and -*b* illustrate the relation between the added amount of the water-soluble silicate and the specific surface area of the acicular α—FeO(OH) powder.
Figure 3B:
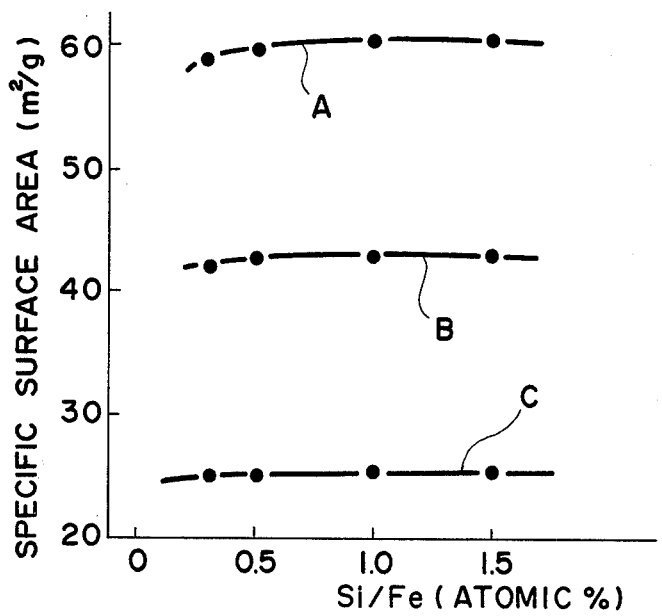

FIG. 3 shows the relationship between the added amount of the water-soluble silicate and the specific surface area of the acicular α—FeO(OH) particles. FIG. 3-a shows the case the water-soluble silicate is added to an aqueous alkaline solution, while FIG. 3-b shows the case the water-soluble silicate is added to an aqueous Fe(OH)$_2$ suspension.

More specifically, FIG. 3-a shows the relationship between the amount of the water-soluble silicate added to the aqueous alkaline solution and the specific surface area of the resultant acicular α—FeO(OH) needles produced under exactly the same conditions as mentioned as to FIG. 2-a. Curved lines A, B and C in FIG. 3-a respectively correspond to the reactant iron (II) concentrations of 0.3 mol/l, 0.4 mol/l and 0.7 mol/l in the suspension.

In regard to FIG. 3-b, shown is the relationship between the amount of the water-soluble silicate added to an aqueous Fe(OH)$_2$ suspension and the specific surface area of the resultant acicular α—FeO(OH) needles produced under exactly the same conditions as mentioned as to FIG. 2-b. Curved lines A, B and C in FIG. 3-b respectively correspond to the reactant iron (II) concentrations of 0.3 mol/l, 0.4 mol/l and 0.7 mol/l in the suspension.

As will be understood from FIG. 2 and FIG. 3, in spite of the shortening of the reaction times required for the production of the acicular α—FeO(OH) needles, the specific surface area of the resultant needles remains at substantially the constant value. This is because the water-soluble silicate has an effect to suppress the oxidation reaction of Fe(OH)$_2$ with oxygen, and as a result, the nucleation step of the α—FeO(OH) and the nuclear growth step thereof to large needles occur not simultaneously but stepwisely. In fact, the magnetite particles come to be mixed into the resultant acicular α—FeO(OH) needles if the water-soluble silicate is provided in the Fe(OH)$_2$ suspension in an amount exceeding 1.7% by atom calculated as the ratio of Si to Fe (II).

Figure 4A:
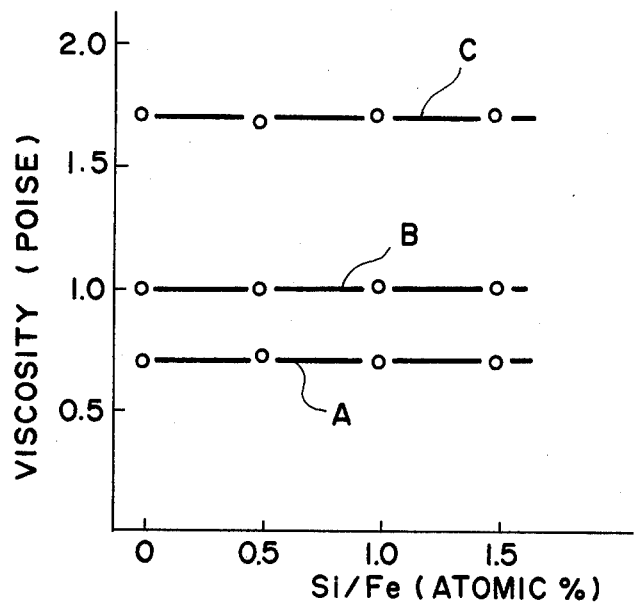
FIGS. 4-*a* and -*b* illustrate the relation between the added amount of the water-soluble silicate and the viscosity of an aqueous solution containing Fe(OH)$_2$.
Figure 4B:
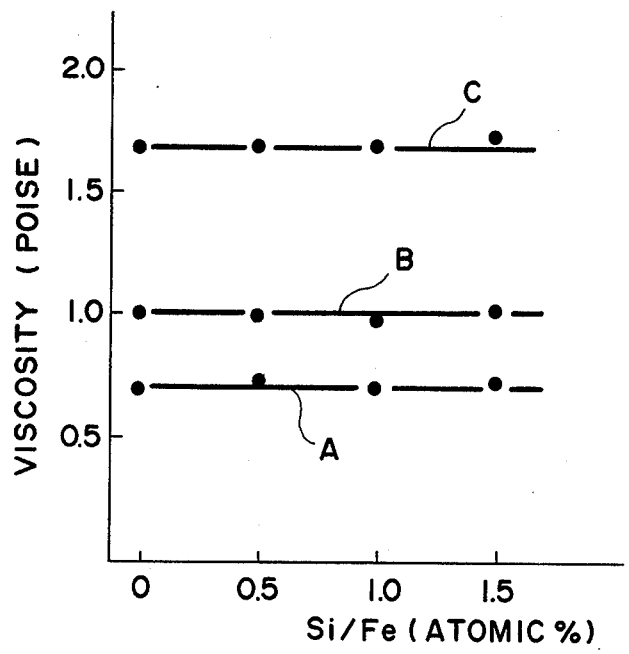

FIG. 4 shows the relationship between the added amount of the water-soluble silicate and the viscosity of the aqueous Fe(OH)$_2$ suspension. FIG. 4-a shows the case the water-soluble silicate is added to an alkaline aqueous solution, while FIG. 4-b shows the case the water-soluble silicate is added to an aqueous Fe(OH)$_2$ suspension.

Lines A, B and C in FIG. 4-a correspond to the Fe (II) concentrations of 0.3 mol/l, 0.4 mol/l and 0.7 mol/l in the suspension, respectively.

Figure 5A:
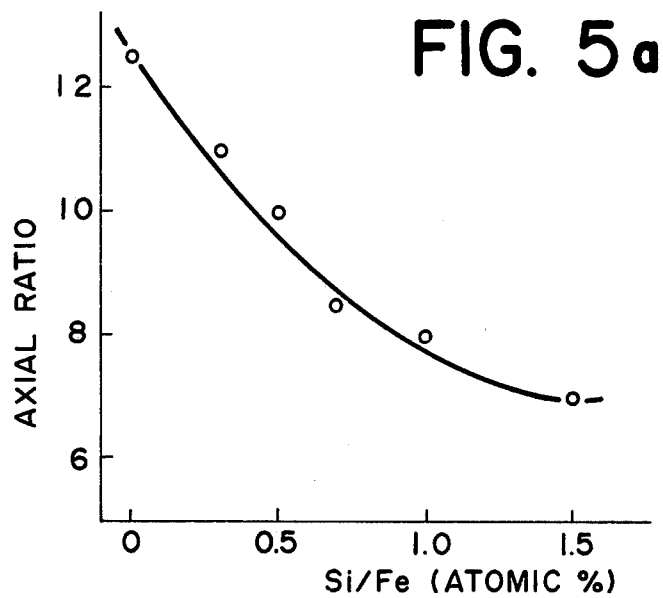
FIGS. 5-*a* and -*b* show the relation between the added amount of the water-soluble silicate and the axial ratio of the acicular α—FeO(OH) needles.
Figure 5B:
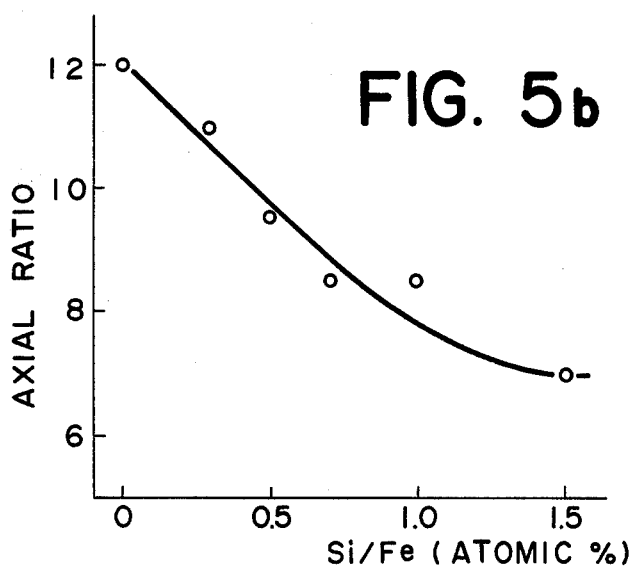

Lines A, B and C in FIG. 4-b correspond to the Fe (II) concentrations of 0.3 mol/l, 0.4 mol/l and 0.7 mol/l in the suspension, respectively. As seen from the drawings, the viscosity of the aqueous solution containing Fe(OH)$_2$ is not influenced by the addition of the water-soluble silicate. In FIG. 5-a, shown is the relationship between the axial ratio (long axis:short axis) of the resultant acicular α—FeO(OH) needles and the amount of the water-soluble silicate contained in an aqueous Fe(OH)$_2$ suspension at a pH of about 13 which is prepared by mixing 1.75 mol/l of an aqueous ferrous sulfate solution with an aqueous NaOH solution containing the water-soluble silicate in such an amount of 0–1.5% by atom calculated as the ratio of Si to Fe (II). The acicular α—FeO(OH) needles are prepared by oxidizing the Fe(OH)$_2$ suspension with introduction of 47l of air per minute at a temperature of 50° C.

In regard to FIG. 5-b, shown is the relationship between the axial ratio (long axis:short axis) of the acicular α—FeO(OH) needles and the amount of the water-soluble silicate contained in a Fe(OH)$_2$ suspension at a pH of about 13 which is prepared by mixing 1.75 mol/l of an aqueous ferrous sulfate solution with an aqueous NaOH solution, and thereafter adding the water-soluble silicate of 0–1.5% by atom calculated as Si/Fe (II) into the suspension. The resultant Fe(OH)$_2$ suspension is then oxidized by introducing 47l of air per minute at a temperature of 50° C. thereinto to form the acicular α—FeO(OH) particles. needles exhibit their axial ratio (long axis:short axis) of less than merely about 10:1, and besides the axial ratio is inclined to be lowered with the increase of the added amount of the water-soluble silicate.

Figure 6A:
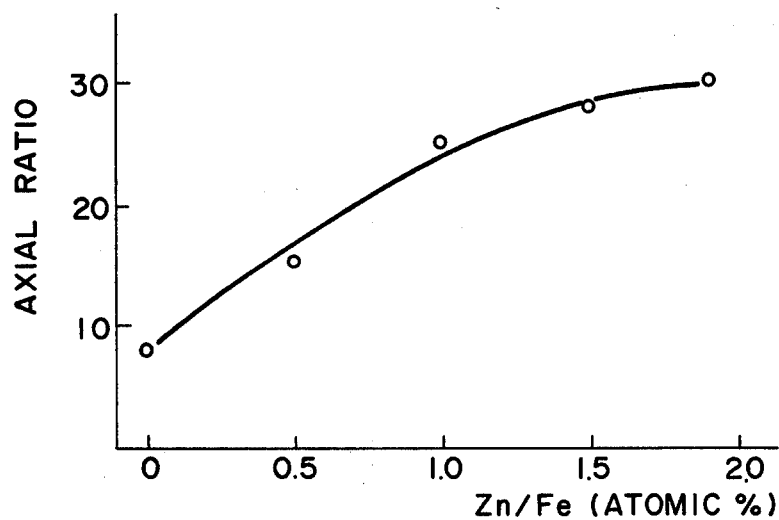
FIGS. 6-*a* and -*b* and FIGS. 7-*a* and -*b* show the relation between the added amount of Zn and the axial ratio (long axis:short axis) and the long axis of the acicular α—FeO(OH) particles when the addition of the water soluble silicate is fixed to be 0.5% by atom calculated as the ratio of Si to Fe (II)
Figure 6B:
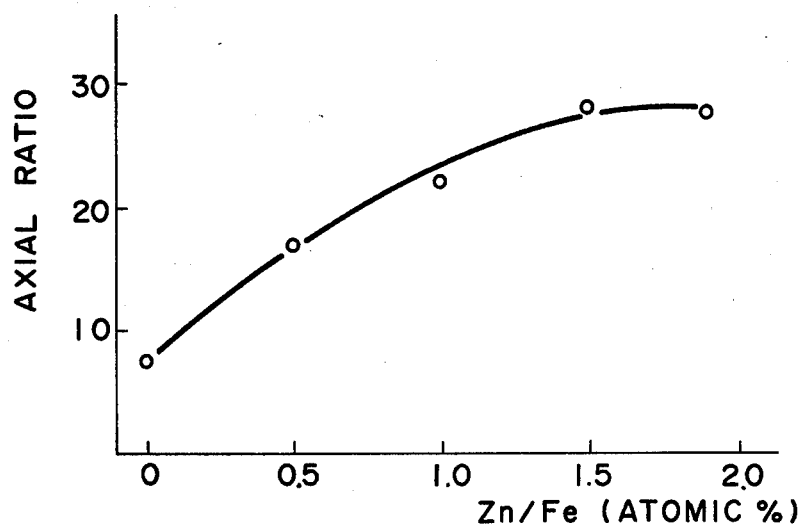

FIGS. 6-a and 6-b show the relationship between the added amount of zinc compound and the axial ratio of the acicular α—FeO(OH) needles when the amount of the water-soluble silicate is fixed to be 0.5% by atom calculated as Si/Fe (II).

In FIG. 6-a shown is the case in which a starting Fe(OH)$_2$ suspension containing Zn(OH)$_2$ with a pH of about 13 is prepared by mixing 1.75 mol/l of an aqueous ferrous sulfate solution containing zinc sulfate in such an amount of 0–2.0% by atom calculated as Zn/Fe (II) with an aqueous NaOH solution containing the water-soluble silicate in an amount of 0.5% by atom calculated as Si/Fe (II), and thereafter the resultant suspension being oxidized to form the α—FeO(OH) needles by introducing 47l of air per minute thereinto at a temperature of 50° C.

On the other hand, in FIG. 6-b shown is the case in which the water-soluble silicate is added directly into the previously prepared Fe(OH)$_2$ suspension while other treating conditions are retained to be the same with those of the abovementioned case.

As seen from FIGS. 6-a and 6-b, the axial ratio of the acicular α—FeO(OH) needles is inclined to be increased with the increase of the added amount of Zn when the amount of the water-soluble silicate is fixed at a constant value.

Figure 7A:
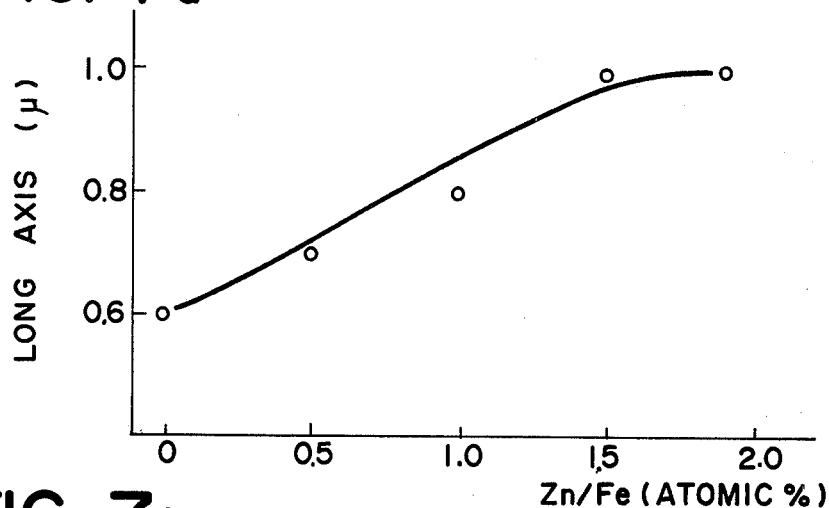
Figure 7B:
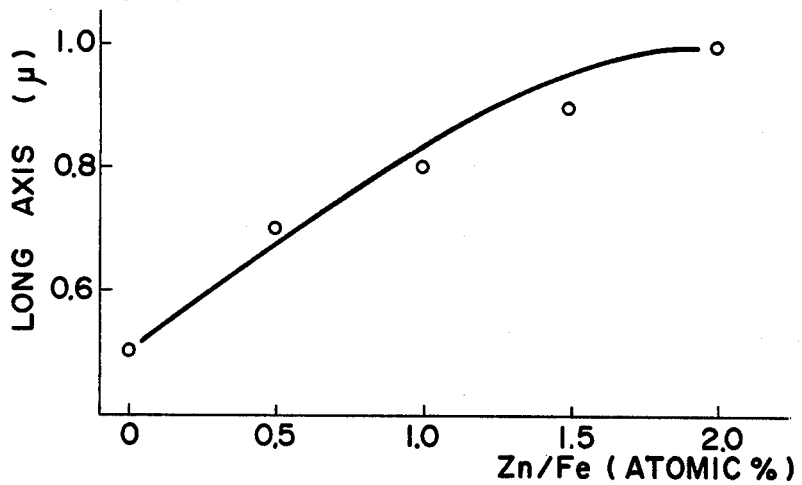

FIGS. 7-a and 7-b show the relationship between the added amount of Zn and the length of long axis of the acicular α-FeO(OH) needles produced under the same conditions as described in regard to FIGS. 6-a and 6-b respectively.

As apparent from FIGS. 7-a and 7-b, the acicular α-FeO(OH) needles are inclined to grow in the direction of their long axis with the increase of the added amount of Zn.

Shown in FIG. 11 is an electron microscope photographic figure (× 20000) of the acicular α-FeO(OH) powder produced by the process (Example 9 detailed later) according to the present invention. As is obvious from this electron microscope photograph, the acicular α-FeO(OH) powder produced by the process according to the present invention has uniform particle size without contamination of dendroidal particles. As will be understood from the aforementioned data, the addition of Si and Zn together into the starting Fe(OH)$_2$ suspension provides remarkable synergetic effects in homogenizing the particle size of the α-FeO(OH) needles without contamination of the dendroidal particles while facilitating the growth of the particles in the direction of their long axis thereby improving the axial ratio.

On the other hand, it is generally known that the added water-soluble silicate further provides the additional effects of suppressing the growth or sintering of the acicular α-FeO(OH) needles during the heat treatment thereof.

The water-soluble silicate used in the present invention remains in the form of SiO$_2$ in the produced acicular α-FeO(OH) needles. Accordingly, by using this acicular α-FeO(OH) particles as a starting material, and through the reduction and oxidation thereof, acicular magnetite particles and acicular maghemite particles having superior properties can be produced.

By the way, the heating treatment of the conventional process under a reducing atmosphere, as a H$_2$ atmosphere, is performed at a temperature of as low as about 350° C. This is because if the heating is carried out in a reducing atmosphere, as a $H_2$ atmosphere, at a temperature of more than 350° C., the acicularity tends to collapse.

Although the acicularity can be maintained by employing the conventional heating treatment, the acicular magnetite particles or the acicular maghemite particles produced from the deformed acicular $\alpha$-FeO(OH) particles are proved from the observation to have numeral vacancies in the insides and on the surfaces thereof. In addition, cross linkage phenomenon is found between the particles. These porous acicular magnetite particles or acicular maghemite particles are surmised to exhibit an apparent single magnetic domain behaviour, but in fact, it seems that they have a quasi single magnetic domain structure in which spontaneous magnetization is partly disturbed owing to the magnetic pole generated in the periphery of the Lorenz's magnetic field in the vacant pores. Further, when these porous acicular magnetite particles or acicular maghemite particles are dispersed in a vehicle to produce a magnetic paint, portions where the surface magnetic pole is generated induce the other fine particles and produce considerably large masses consisting of many particles in the paint thereby inviting the deterioration of the magnetic property of the magnetic recording media.

However, according to the present invention, the acicularity of the starting acicular $\alpha$-FeO(OH) particles can be maintained even at a temperature of as high as 400° C.– 600° C. in a reducing gas, and at the same time the pores formed on the particle surfaces and within the particles can be eliminated, whereby even particles having smooth surfaces and of substantially a high density may be produced.

The acicular magnetite particles obtained according to a conventional manner is extremely unstable in an oxidizing gas like air. This is because Fe (II) in the acicular magnetite particles is very easily oxidized. For example, the acicular magnetite particles have a weight percent of Fe (II)/Fe (III) being approximate to a theoretical value (0.5) when measured immediately after they are produced in a reducing gas, but when they are taken out and left in the air, the weight percent of Fe (II)/Fe (III) decreases with the lapse of time. This tendency appears in a shorter time as the temperature becomes higher. Therefore, in general, the produced acicular magnetite powder shows less than 0.3% by weight of Fe (II)/Fe (III). In this connection, the following description is found in Japanese Patent Laying Open No. 8496/74:

"In the conventional manner for producing a large amount of $Fe_3O_4$ in a stable condition, the ratio of Fe (II)/Fe (III) has remained at most about 0.30% by weight, and it has been extremely difficult to obtain the ratio higher than that."

However, the acicular magnetite particles produced according to the present invention are stable in the air and has a ratio of Fe (II)/Fe (III) in the range of 0.3–0.5% by weight, owing to $SiO_2$ included therein.

FIG. 8 shows the coercive force Hc of the acicular maghemite powder produced by reducing the acicular $\alpha$-FeO(OH) powder in a stream of $H_2$ gas at each temperature between 300° C. and 600° C. to produce acicular magnetite powder having the saturation magnetization Os of 85–90 emu/g, and thereafter oxidizing the produced powder for 120 minutes in the air at a temperature of 300° C.

Acicular $\alpha$-FeO(OH) powder obtained in Example 1 (1.2% by atom of Si/Fe(II) was added), Example 14 (0.65% by atom of Si/Fe(II) was added), and Comparison Example 1 detailed hereinafter respectively correspond to the curved lines A, B and C in FIG. 8 as their starting materials. The curved lines A and B show that with the increase of the reduction temperature the coercive force increases but it starts to decrease after the temperature exceeds 550° C. It is surmised that the increase of the coercive force is invited because the acicularity of the produced acicular maghemite particles is sufficiently retained and the particles are highly condensed at the surfaces and in the insides thereof thereby eliminating the pores. The curved line C shows that the coercive force is suddenly lowered when the reduction temperature exceeds 400° C. This is because the acicular particles are broken down and the axial ratio of the particles are lowered.

Now the conditions for carrying out the process according to the present invention will be described in detail as following;

As an aqueous Fe (II) salt solution used in the process of the present invention, an aqueous ferrous sulfate solution, an aqueous ferrous chloride solution et al., can be mentioned.

As zinc compound to be used in the process according to the present invention, water-soluble Zn compounds including zinc sulfate, zinc chloride and zinc nitrate et al., can be mentioned. The water-soluble Zn compound may be added previously to the aqueous Fe (II) solution, or to the aqueous $Fe(OH)_2$ suspension. In either case, the same effect can be obtained.

As the water-soluble silicate used in the process according to the present invention, sodium or potassium silicate can be mentioned. The water-soluble silicate may be added previously to the alkaline aqueous solution or to the $Fe(OH)_2$ suspension. In either case, it exhibits an effect of homogenizing $Fe(OH)_2$ floccules in the suspension. The added amount of the water-soluble silicate should be in an amount of 0.1–1.7% by atom calculated as Si/Fe (II). If the added amount is less than 0.1% by atom calculated as Si/Fe (II), the objects of the present invention can not be fully achieved, while if it is more than 1.7% by atom the magnetite particles come to be mixed in the final product.

In general, the final acicular $\alpha$-FeO(OH) powder sometimes contain water-insoluble $SiO_2$ as an impurity in an amount of about 0.1% by atom calculated as Si/Fe (II), as it is contained in the starting material, washing water, and the introduced air in the course of producing the same.

However, the water-insoluble $SiO_2$ originally contained in the starting materials and so on is not dissolved in water and has no influence upon the process according to the present invention.

In regard to the amount of the water-soluble Zn compound and the water-soluble silicate, they must be added in an amount of 0.1–2.3% by atom calculated as Zn/Fe (II), 0.1–1.7% by atom calculated as Si/Fe (II), and 0.3–2.5% by atom calculated as (Zn + Si)/Fe (II). If it is less than 0.1% by atom calculated as Zn/Fe (II), the axial ratio of the particles is not sufficiently improved, and if it is more than 2.3% by atom, magnetite particles come to be mixed in the final product. Further, if it is less than 0.3% by atom calculated as (Zn + Si)/Fe (II), the objects of the present invention are not fully achieved while if it is more than 2.5% by atom, magnetite particles come to be mixed in the final product. When the particle size and the axial ratio of the produced acicular α-FeO(OH) particles are taken into account, 0.3-0.7% by atom calculated as Si/Fe (II), 1.0-2.0% by atom calculated as Zn/Fe (II) and 1.0-2.5% by atom calculated as (Zn + Si)/Fe (II) are preferred.

In the present invention, if the reduction of the α-FeO(OH) needles in the reducing gas is carried out at a temperature of less than 300° C., the reducing reaction does not progress smoothly while if it is more than 600° C., the reduciton progresses radically and the needles grow rapidly thereby facilitating the deformation of the acicularity of the needles and the sintering of the particles. From the industrial view points, a reducing temperature between 400° C. and 550° C. is preferred.

Now the advantages of the present invention will be summarized as following.

According to the present invention, acicular magnetite needles and acicular maghemite needles having uniform particle size and including no dendroidal particles while maintaining the original particle shape of the starting acicular α-FeO(OH) needles can be easily prepared. The acicular magnetite powder or the acicular maghemite powder thus prepared has a large coercive force and a large saturation magnetization Os and therefore is suitable for the use as a magnetic material for recording of high output, high sensitivity and high density. Besides, when said acicular magnetite powder or acicular maghemite powder is used in the production of magnetic paint, they exhibit good dispersiveness in a vehicle and superior orientation and packing property in a coating contributing to the production of preferable magnetic recording media.

Now the present invention will be described by the examples and the comparison examples.

The amount of Si in the examples and the comparison examples was measured according to JIS G 1212, and the amounts of Fe (II) and Fe (III) were measured by the method of chemical analysis. The amount of Zn was measured by fluorescent X-ray method. The specific surface area was measured by B.E.T. method, the viscosity by Stormer's viscometer. The distribution of particle size was measured by introducing about 10 mg of sample into 50 cc of pure water, fully stirring and diluting by scores of times, further stirring and diluting by about 1000 times to prepare a dispersing solution, observing the dispersing solution on a VTR through a ultramicroscope while illuminating the solution, and calculating by Stokers' formula numbering the particles at a fixed sedimentation level. This is detailed in "Industrial and Engineering Chemistry Fundamentale," vol. 14, No. 1, pages 47–51 (1975).

Preparation of acicular α-FeO(OH) particles as starting material

EXAMPLE 1

30.0l of an aqueous ferrous sulfate solution containing 1.22 mol of Fe (II) per liter was added to a 20.0l of 8.39-N NaOH aqueous solution having been added of 92.0g of sodium silicate (No. 3 on J.I.S. K-1408), 28.55 wt% as $SiO_2$ corresponding to 1.2% by atom based on the amount of iron (II) hydroxide in the suspension and calculated as the ratio of Si to Fe (II) to prepare 50.0l of a suspension, whereby $Fe(OH)_2$ was produced at pH 13.4 and at a temperature of 35° C. This product had a viscosity of 1.74 poise. At the temperature of 45° C., air was introduced to the aqueous suspension consisting of $Fe(OH)_2$ at a rate of 20 liters per minute for 9.5 hours to produce acicular α-FeO(OH) needles.

After extracting a portion of the reaction solution and acidifying it with hydrochloric acid, termination of the oxidation reaction was determined by the blue color reaction test of Fe (II) with red prussiate solution.

Thus obtained needles were washed with water, filtered and dried by a conventional manner. Chemical analysis showed that the resulting acicular α-FeO(OH) needles had Si content of 1.32 atomic % calculated as the ratio of Si to Fe (II) and had a specific surface area of 24.8 $m^2/g$. Measurement of particle size distribution and electron microscope photographs showed that the mean value of their long axis was 0.45 μm and an average long axis: short axis ratio was 8.0 : 1 and that the needles had highly uniform particle size and were not contaminated with dendroidal particles.

Results obtained from the measurement of particle size distribution are shown in FIG. 9-a. It is clearly shown in FIG. 9-a that the acicular α-FeO(OH) needles produced according to the present invention have an uniform particle size in comparison with the conventional powder (FIG. 9-b).

EXAMPLES 2–8 (COMPARISON EXAMPLE 2–3)

Acicular α-FeO(OH) needles were prepared according to the same procedure as described in Example 1, except that the kind of the aqueous solution of ferrous salt, the concentration of Fe (II), the amount of the aqueous NaOH solution, the amount of the water-soluble silicate and the time of the addition thereof were varied.

Shwon in Table 1 and Table 2 are the principal conditions for the preparation and the properties of the powder. In each example, from Example 2 to Example 8, the obtained powder was consisting of acicular α-FeO(OH) needles which proved to have uniform particle size and were not contaminated with dendroidal particles as a result of the measurement of particle size distribution and electron microscope photographs. The powder obtained in Comparison Examples 2–3 proved to have acicular needles and granular particles mixed together as a result of the measurement of particle size distribution and electron microscope photographs. X-ray analysis showed that they were consisting of a mixture of α-FeO(OH) and magnetite.

EXAMPLE 9

12l of an aqueous solution of 1.83 mol of ferrous sulfate per liter obtained from addition of zinc sulfate in an amount of 1.45 atomic % based on the amount of the iron (II) in the suspension to be formed and calculated as the ratio of Zn to Fe (II) was added to a 18l of 5.77-N NaOH aqueous solution having been prepared beforehand in a reactor by addition of 25.4 g of sodium silicate (No. 3 on J.I.S. K-1408), 28.55 wt% as $SiO_2$ corresponding to 0.55 atomic % calculated as the ratio of Si to Fe (II) to prepare 30.0l of a suspension, whereby preparation of an aqueous suspension of $Fe(OH)_2$ and $Zn(OH)_2$ was carried out at a pH of 13.1, and at a temperature of 50° C.

To this aqueous suspension consisting of $Fe(OH)_2$ and $Zn(OH)_2$, air was introduced at a rate of 47l per minute for 21 hours at a temperature of 50° C. to produce acicular α-FeO(OH) needles.

After extracting a portion of the reaction solution and acidifying it with hydrochloric acid, termination of the oxidation reaction was determined by the blue color reaction test of Fe (II) with red prussiate solution.

Thus obtained needles were washed with water, filtered and dried by a conventional manner.

Resulting acicular α-FeO(OH) needles had Si content of 0.66 atomic % calculated as the ratio of Si to Fe (II) and Zn content of 1.33 atomic % calculated as the ratio of Zn to Fe (II). Measurement of particle size distribution and electron microscope photographs ($\times 20000$) showed that the mean value of their long axis was 1.00 μm and an average long axis: short axis ratio was 30.0 : 1 and that the needles had highly uniform particle size and were not contaminated with dendroidal particles.

EXAMPLES 10–30 (COMPARISON EXAMPLES 5–10)

Acicular α-FeO(OH) needles were prepared according to the same procedure as described in Example 9, except that the kind of the aqueous solution of ferrous salt, the concentration of Fe (II), the amount of the aqueous NaOH solution, the kind of water-soluble zinc compound, the amount of water-soluble zinc compound and the time of the addition thereof, and the amount of the water-soluble silicate and the time of the addition thereof were varied.

Shown in Table 1 and Table 2 are the principal conditions for the preparation and the properties of the powder. In each example, from Example 10–Example 30, the obtained powder was consisting of acicular α-FeO(OH) needles which proved to have a large length-to-width ratio, highly uniform particle size, and include no dendroidal particles as a result of the measurement of particle size distribution and electron microscope photographs. The powder obtained in Comparison Examples 5–10 proved to have acicular needles and granular particles mixed together as a result of the measurement of particle size distribution and electron microscope photographs. X-ray analysis showed that they were a mixture of α-FeO(OH) and magnetite.

Comparison Example 1

Acicular α-FeO(OH) needles were prepared according to the same procedure as described in Example 18, except that neither the water-soluble zinc compound nor the water-soluble silicate was added. Shown in Table 2 are the principal conditions for the preparation and the properties of the powder.

Results obtained from the measurement of particle size distribution are shown in FIG. 9-b. It is clearly shown in FIG. 9-b that the obtained acicular α-FeO(OH) needles had irregular particle sizes and electron microscope photographs showed that the obtained needles were contaminated with dendroidal particles.

Comparison Example 4

Acicular α-FeO(OH) powder was prepared according to the same procedure as described in Example 18, except that no water-soluble silicate was added and the addition of zinc sulfate was in an amount of 1.45 atomic % calculated as the ratio of Zn to Fe (II). The principal conditions for the preparation and the properties of the powder are shown in Table 2. The obtained acicular α-FeO(OH) powder proved to have irregular particle size and include dendroidal particles mixed therewithin as is obvious from the result of the measurement of particle size distribution and electron microscope photographs ($\times 20000$) shown in FIG. 12.

Production of acicular magnetite powder

EXAMPLE 31

300g of the acicular α-FeO(OH) needles obtained in Example 2 was introduced into a 3l capacity retort of a type having one open end, and while rotating this retort the needles were reduced by introducing $H_2$ gas at a rate of 3l per minute at the temperature of 350° C. to produce 260g of acicular magnetite powder. The measurement of particle size distribution and electron microscope photographs showed that the obtained acicular magnetite powder had retained the particle shapes of the acicular α-FeO(OH) needles which were the starting material and that the mean value of their long axis was 0.35 μm, an average long axis: short axis ratio was 8.0 : 1, their particle size was uniform and no dendroidal particles mixed therewith. The ratio of Fe (II)/Fe (III) was 0.41. Measurement of magnetic properties showed that the coercive force Hc was 433 Oe, and the saturation magnetization Os was 85 emu/g.

EXAMPLES 32–84 (COMPARISON EXAMPLES 11 and 13)

Acicular magnetite powder was prepared according to the same procedure as described in Example 31, except that the kind of the starting material and the reduction temperature were varied. The principal conditions for the preparation and the properties of the powder are shown in Table 3 and Table 4.

The measurement of particle size distribution and electron microscope photographs showed that the acicular magnetite powder obtained in Examples 32–84 had uniform particle size and included no dendroidal particles. The measurement of particle size distribution and electron microscope photographs showed that the acicular magnetite powder obtained in Comparison Examples 11 and 13 had irregular particle size and dendroidal particles mixed therewith.

Comparison Example 12

300g of the acicular α-FeO(OH) needles obtained in Comparison Example 1 was introduced into a 3l capacity retort of a type having one open end. While rotating this retort the powder was reduced by introducing $H_2$ gas at the rate of 3l per minute at the temperature of 450° C. Thereafter, $H_2$ gas was substituted by $N_2$ gas, then the powder was cooled and black magnetic powder was taken out into the air. Several minutes after the resulting powder having been taken out into the air, thermal evolution was caused and the black magnetic powder turned brown from the surface thereof due to a radical oxidation reaction.

Production of acicular maghemite powder

EXAMPLE 85

120g of the acicular magnetite powder obtained in Example 32 was oxidized in the air at a temperature of 270° C. for 90 minutes to produce acicular maghemite powder. The measurement of particle size distribution and electron microscope photographs showed that the obtained acicular maghemite powder had retained the particle shapes of the acicular α-FeO(OH) needles which were the starting material and that the mean value of their long axis was 0.35 μm, an average axial ratio (long axis: short axis) was 8.0 : 1, their particle size was uniform and no dendroidal particles mixed therewith.

Magnetic measurement showed that the coercive force Hc was 398 Oe, and the saturation magnetization Os was 81 emu/g.

EXAMPLES 86–114 (Comparison Examples 14 and 15)

Acicular maghemite powder was prepared according to the same procedure as described in Example 85, except that the kind of the acicular magnetite powder was varied. Properties of this powder are shown in Table 5 and Table 6.

The measurement of particle size distribution and electron microscope photographs showed that the acicular maghemite powder obtained in each example, Examples 86–114, had uniform particle size and included no dendroidal particles.

FIG. 10-b shows the result of the measurement of particle size distribution of the acicular maghemite powder obtained in Comparison Example 14. As is clearly shown in FIG. 10-b, the obtained acicular maghemite powder had irregular particle size, and the measurement of particle size distribution and electron microscope photographs showed that they were contaminated with dendroidal particles.

The measurement of particle size distribution and electron microscope photographs showed that the acicular maghemite powder obtained in Comparison Example 15 had irregular particle size and was contaminated with dendroidal particles.

Comparison Example 16

300g of the acicular α-FeO(OH) needles obtained in Example 15 was introduced into a 3l capacity retort of a type having one open end, and while rotating this retort the powder was reduced by introducing $H_2$ gas at a rate of 3l per minute at a temperature of 700° C. Thereafter, $H_2$ gas was substituted by $N_2$ gas, and the powder was cooled. While further introducing air, oxidation was carried out at a temperature of 270° C. for 90 minutes and acicular maghemite powder was produced. The measurement of particle size distribution and electron microscope photographs showed that the obtained acicular maghemite powder had broken needles and that the mean value of their long axis was 0.30 μm and the axial ratio (long axis: short axis) was 5.0 : 1. Magnetic measurement showed that the coercive force Hc was 273 Oe and the saturation magnetization Os was 66 emu/g.

Production of magnetic tape

EXAMPLE 115

The acicular magnetite powder obtained in Example 32 and binders composed as mentioned below are introduced into a ball mill and mixed to disperse therein for 8 hours to produce magnetic paint.

| | |
|---|---|
| Acicular magnetite powder | 100 g |
| Vinyl resin | 20 g |
| (vinyl acetate: vinyl chloride = 3 : 91 copolymer) | |
| Nitrile rubber | 100 g |
| (acrylonitrile copolymer) | |
| Toluene | 100 g |
| Methyl ethyl ketone | 75 g |
| Methyl isobutyl ketone | 75 g |
| dispersing agent (lecithin) | 0.2 g |

A solvent (toluene: methyl ethyl ketone: methyl isobutyl ketone = 1:1:1) was added to the obtained magnetic paint for the adjustment of its viscosity. Thereafter, applying this paint onto a polyester resin film and drying the coated surface by a conventional manner, magnetic tape was produced. The coercive force Hc of this magnetic tape was 380 Oe, the residual magnetic flux Br was 1380 Gauss, and the rectangular Br/Bm was 0.86.

EXAMPLES 116–133 (Comparison Examples 17 and 18)

Magnetic tape was produced according to the same procedure as described in Example 115, except that the kind of the acicular magnetic iron oxide powder was varied. Properties of this magnetic tape are shown in Table 7.

Table 1

| | | Preparation of an aqueous suspension of Fe(OH)₂ or Fe(OH)₂ and Zn(OH)₂ | | | | | | |
|---|---|---|---|---|---|---|---|---|
| | | Aqueous Fe(II) solution | | Aqueous NaOH solution | | Aqueous Zn solution | | |
| Example | Kind | Concentration (mol/l) | Added quantity (l) | Concentration (N) | Added quantity (l) | Kind | Time of the addition * | Added amount of Zn/Fe (atom %) |
| 1 | FeSO₄ | 1.22 | 30.0 | 8.39 | 20.0 | — | — | — |
| 2 | " | 0.58 | " | 2.97 | " | — | — | — |
| 3 | " | 0.80 | " | 3.12 | " | — | — | — |
| 4 | FeCl₂ | 1.22 | " | 8.39 | " | — | — | — |
| 5 | FeSO₄ | 1.17 | " | 8.05 | " | — | — | — |
| 6 | " | 0.50 | " | 2.55 | " | — | — | — |
| 7 | " | 0.67 | " | 2.60 | " | — | — | — |
| 8 | FeCl₂ | 1.17 | " | 8.05 | " | — | — | — |
| 9 | FeSO₄ | 1.83 | 12.0 | 5.77 | 18.0 | ZnSO₄ | A | 1.45 |
| 10 | " | " | " | " | " | " | " | 1.90 |
| 11 | " | " | " | " | " | " | " | 1.20 |
| 12 | " | " | " | " | " | " | " | 0.45 |
| 13 | " | " | " | " | " | " | " | 1.45 |
| 14 | " | " | " | " | " | " | " | " |
| 15 | " | " | " | " | " | " | 1.00 | |
| 16 | FeCl₂ | " | " | " | " | ZnCl₂ | " | 1.45 |
| 17 | FeSO₄ | " | " | " | " | ZnSO₄ | B | " |
| 18 | " | 1.13 | " | 4.83 | " | " | A | 1.25 |
| 19 | " | 1.50 | 20.0 | 12.00 | 10.0 | " | " | 0.45 |
| 20 | " | 1.75 | 12.0 | 5.67 | 18.0 | " | " | 1.50 |
| 21 | " | " | " | " | " | " | " | 2.00 |
| 22 | " | " | " | " | " | " | " | 1.00 |
| 23 | " | " | " | " | " | " | " | 0.50 |
| 24 | " | " | " | " | " | " | " | 1.50 |
| 25 | " | " | " | " | " | " | " | " |

Table 1-continued

| | | | | | | | | |
|---|---|---|---|---|---|---|---|---|
| 26 | " | " | " | " | " | " | " | 1.00 |
| 27 | FeCl$_2$ | " | " | " | " | ZnCl$_2$ | " | 1.50 |

Preparation of an aqueous suspension of Fe(OH)$_2$ of Fe(OH)$_2$ and Zn(OH)$_2$

Addition of Sodium Silicate (No. 3 on J.I.S. K-1408)

| Example | Time of the addition | Added amount (g) | Atomic % calculated as Si/Fe | PH | Viscosity |
|---|---|---|---|---|---|
| 1 | C | 92.0 | 1.2 | 13.4 | 1.74 |
| 2 | " | 11.0 | 0.3 | 13.1 | 0.73 |
| 3 | " | 80.0 | 1.6 | 12.8 | 0.88 |
| 4 | " | 92.0 | 1.2 | 13.4 | 1.75 |
| 5 | B | 74.0 | 1.0 | 13.1 | 1.65 |
| 6 | " | 10.0 | 0.3 | 12.2 | 0.62 |
| 7 | " | 63.0 | 1.5 | 11.5 | 0.65 |
| 8 | " | 74.0 | 1.0 | 13.2 | 1.58 |
| 9 | C | 25.4 | 0.55 | 13.1 | 2.01 |
| 10 | " | " | " | 13.2 | 1.94 |
| 11 | " | " | " | 13.2 | 1.92 |
| 12 | " | " | " | 13.2 | 1.73 |
| 13 | " | 16.1 | 0.35 | 13.1 | 2.03 |
| 14 | " | 30.0 | 0.65 | 13.1 | 1.98 |
| 15 | " | 66.8 | 1.45 | 13.2 | 1.93 |
| 16 | " | 25.4 | 0.55 | 13.2 | 1.99 |
| 17 | " | " | " | 13.0 | 2.02 |
| 18 | " | 10.0 | 0.35 | 13.1 | 1.01 |
| 19 | " | 91.5 | 1.45 | 13.2 | 2.02 |
| 20 | B | 22.1 | 0.50 | 13.2 | 1.98 |
| 21 | " | " | " | 13.1 | 1.97 |
| 22 | " | " | " | 13.1 | 1.91 |
| 23 | " | " | " | 13.2 | 1.77 |
| 24 | " | 13.3 | 0.30 | 13.0 | 1.96 |
| 25 | " | 30.9 | 0.70 | 13.2 | 1.98 |
| 26 | " | 66.3 | 1.50 | 13.1 | 1.92 |
| 27 | " | 22.1 | 0.50 | 13.1 | 2.01 |

*A: An aqueous Zn(II) solution was added to an aqueous Fe(II) solution.
B: An aqueous Zn(II) solution or water-soluble silicate was added to an aqueous suspension of Fe(OH)$_2$.
C: Water-soluble silicate was added to an alkaline aqueous solution.

Production of acicular α-Fe(OH) needles

Properties of powder

| Example | Reaction time (hour) | Si/Fe (atom %) | Zn/Fe (atom %) | Surface area (m$^2$/g) | Long axis (μm) | Axial ratio (long axis: short axis) |
|---|---|---|---|---|---|---|
| 1 | 9.5 | 1.32 | — | 24.8 | 0.45 | 8.0 : 1 |
| 2 | 1.0 | 0.41 | — | 52.1 | 0.35 | 8.0 : 1 |
| 3 | 1.0 | 1.70 | — | 44.3 | 0.11 | 4.0 : 1 |
| 4 | 9.0 | 1.33 | — | 24.5 | 0.48 | 8.0 : 1 |
| 5 | 8.5 | 1.09 | — | 25.6 | 0.54 | 8.5 : 1 |
| 6 | 1.0 | 0.37 | — | 68.4 | 0.25 | 8.0 : 1 |
| 7 | 1.0 | 1.60 | — | 47.2 | 0.13 | 4.0 : 1 |
| 8 | 9.0 | 1.07 | — | 26.2 | 0.48 | 8.5 : 1 |
| 9 | 21.0 | 0.66 | 1.33 | 32.2 | 1.00 | 30.0 : 1 |
| 10 | 22.0 | 0.68 | 1.73 | 34.2 | 1.10 | 28.0 : 1 |
| 11 | 19.0 | 0.65 | 1.12 | 30.1 | 0.80 | 27.0 : 1 |
| 12 | 14.0 | 0.66 | 0.41 | 28.8 | 0.70 | 20.0 : 1 |
| 13 | 28.0 | 0.47 | 1.31 | 32.1 | 1.10 | 30.0 : 1 |
| 14 | 13.0 | 0.78 | 0.42 | 32.5 | 0.90 | 26.0 : 1 |
| 15 | 6.5 | 1.58 | 0.96 | 31.2 | 0.60 | 17.0 : 1 |
| 16 | 22.0 | 0.79 | 1.35 | 32.6 | 0.80 | 30.0 : 1 |
| 17 | 20.0 | 0.77 | 1.33 | 32.7 | 0.80 | 28.0 : 1 |
| 18 | 7.0 | 0.48 | 1.14 | 43.5 | 0.60 | 28.0 : 1 |
| 19 | 24.0 | 1.53 | 0.43 | 25.2 | 1.00 | 20.0 : 1 |
| 20 | 21.0 | 0.62 | 1.35 | 33.1 | 0.90 | 28.0 : 1 |
| 21 | 22.0 | 0.65 | 1.82 | 34.6 | 1.00 | 27.0 : 1 |
| 22 | 18.0 | 0.64 | 0.94 | 31.2 | 0.80 | 23.0 : 1 |
| 23 | 15.0 | 0.62 | 0.46 | 28.7 | 0.70 | 17.0 : 1 |
| 24 | 27.0 | 0.41 | 1.28 | 31.7 | 1.00 | 30.0 : 1 |
| 25 | 12.0 | 0.82 | 1.36 | 32.5 | 0.80 | 25.0 : 1 |
| 26 | 5.0 | 1.63 | 0.97 | 30.8 | 0.50 | 15.0 : 1 |
| 27 | 20.0 | 0.63 | 1.37 | 31.7 | 0.90 | 28.0 : 1 |

**A: An aqueous Zn(II) solution was added to an aqueous Fe(II) solution.
B: An aqueous Zn(II) solution or water-soluble silicate was added to an aqueous suspension of Fe(OH)$_2$.
C: Water-soluble silicate was added to an alkaline aqueous solution.

Table 2

Preparation of an aqueous suspension of Fe(OH)$_2$ or Fe(OH)$_2$ Zn(OH)$_2$

| Example and Comparison Example | Aqueous Fe(II) solution | | | Aqueous NaOH solution | | Aqueous Zn solution | | Added amount of Zn/Fe (atom %) |
|---|---|---|---|---|---|---|---|---|
| | Kind | Concentration (mol/l) | Added quantity (l) | Concentration (N) | Added quantity (l) | Kind | Time of the addition | |
| Example 28 | FeSO$_4$ | 1.75 | 12.0 | 5.67 | 18.0 | ZnSO$_4$ | B | 1.50 |
| 29 | " | 1.00 | " | 4.67 | " | " | A | 1.20 |

Table 2-continued

| | | | | | | | | |
|---|---|---|---|---|---|---|---|---|
| 30 | " | 1.80 | 20.0 | 13.20 | 10.0 | " | " | 0.50 |
| Comparison Example 1 | FeSO$_4$ | 1.13 | 12.0 | 4.83 | 18.0 | — | — | — |
| " 2 | " | 0.58 | 3.0 | 2.97 | 2.0 | — | — | — |
| " 3 | " | 0.50 | " | 2.55 | " | — | — | — |
| " 4 | " | 1.13 | 12.0 | 4.83 | 18.0 | ZnSO$_4$ | A | 1.45 |
| " 5 | " | 1.83 | " | 5.77 | " | " | " | 1.45 |
| " 6 | " | " | 41 | " | " | " | " | 3.20 |
| " 7 | " | " | " | " | " | " | " | 2.30 |
| " 8 | " | 1.75 | " | 5.67 | " | " | " | 1.50 |
| " 9 | " | " | " | " | " | " | " | 3.00 |
| " 10 | " | " | " | " | " | " | " | 2.00 |

| | Preparation of an aqueous suspension of FE(OH)$_2$ or FE(OH)$_2$ and Zn(OH)$_2$ | | | | |
|---|---|---|---|---|---|
| Example and Comparison Example | Addition of Sodium Silicate (No.3 on J.I.S. K-1408) | | | PH | Viscosity |
| | Time of the* addition | Added amount (g.) | Atomic % calculated as Si/Fe | | |
| Example 28 | B | 22.1 | 0.50 | 13.1 | 2.02 |
| 29 | " | 7.6 | 0.30 | 13.2 | 1.09 |
| 30 | " | 113.6 | 1.50 | 13.1 | 2.02 |
| Comparison Example 1 | — | — | — | 13.1 | 1.01 |
| " 2 | C | 8.1 | 2.20 | 13.0 | 0.74 |
| " 3 | B | 6.3 | 2.00 | 12.5 | 0.57 |
| " 4 | — | — | — | 13.2 | 1.14 |
| " 5 | C | 66.8 | 1.45 | 13.0 | 2.01 |
| " 6 | " | 55.4 | 1.20 | 13.1 | 2.02 |
| " 7 | " | 101.4 | 2.20 | 13.2 | 2.01 |
| " 8 | B | 66.3 | 1.50 | 13.2 | 1.99 |
| " 9 | " | 44.2 | 1.00 | 13.2 | 2.01 |
| " 10 | " | 88.4 | 2.00 | 13.1 | 2.03 |

* A: An aqueous Zn(II) solution was added to an aqueous Fe(II) solution.
B: An aqueous Zn(II) solution or water-soluble silicate was added to an aqueous suspension of Fe(OH)$_2$.
C: Water-soluble silicate was added to an alkaline aqueous solution.
** Mixed powder of α-FeO(OH) and magnetite was produced

| | Production of acicular α-FeO(OH) needles | | | | | |
|---|---|---|---|---|---|---|
| | | Properties of powder | | | | |
| Example and Comparison Example | Reaction time (hour) | Si/Fe (atom %) | Zn/Fe (atom %) | Surface area (m$^2$/g) | Long axis (μm) | Axial ratio (long axis: short axis) |
| Example 28 | 20.0 | 0.61 | 1.39 | 32.4 | 0.90 | 28.0 : 1 |
| 29 | 7.0 | 0.42 | 1.01 | 44.8 | 0.40 | 27.0 : 1 |
| 30 | 25.0 | 1.63 | 0.48 | 24.9 | 1.20 | 18.0 : 1 |
| Comparison Example 1 | 12.0 | — | — | 37.6 | 0.60 | 10.0 : 1 |
| " 2 | — | — | — | — | — | — |
| " 3 | — | — | — | — | — | — |
| " 4 | 13.0 | — | 1.23 | 36.7 | 0.90 | 23.0 : 1 |
| " 5 | — | — | — | — | — | — |
| " 6 | — | — | — | — | — | — |
| " 7 | — | — | — | — | — | — |
| " 8 | — | — | — | — | — | — |
| " 9 | — | — | — | — | — | — |
| " 10 | — | — | — | — | — | — |

** Mixed powder of α-FeO(OH) and magnetite was produced.

Table 3

| Example | Kind of starting material (Example No.) | Reduction Temperature (°C) | Production of acicular magnetite powder | | | | |
|---|---|---|---|---|---|---|---|
| | | | Properties of powder | | | magnetic properties | |
| | | | Fe(II)/Fe(III) | Long axis. (μm) | Axial ratio (long axis: short axis) | σs * (emu/g) | Hc * (σe) |
| 31 | Example 2 | 350 | 0.41 | 0.35 | 8.0 : 1 | 85 | 433 |
| 32 | " | 400 | 0.44 | " | " | 87 | 440 |
| 33 | " | 450 | 0.45 | 0.30 | 7.0 : 1 | 88 | 452 |
| 34 | " | 550 | 0.47 | " | " | 90 | 450 |
| 35 | Example 4 | 400 | 0.40 | 0.40 | 7.0 : 1 | 86 | 435 |
| 36 | " | 450 | 0.42 | " | " | 88 | 448 |
| 37 | " | 500 | 0.46 | 0.35 | 6.0 : 1 | 88 | 456 |
| 38 | " | 600 | 0.45 | 0.30 | 5.0 : 1 | 90 | 451 |
| 39 | Example 1 | 400 | 0.43 | 0.40 | 7.0 : 1 | 87 | 455 |
| 40 | Example 3 | 450 | 0.46 | 0.10 | 4.0 : 1 | 82 | 380 |
| 41 | Example 5 | 400 | 0.42 | 0.45 | 6.5 : 1 | 88 | 440 |
| 42 | " | 450 | 0.44 | " | " | " | 446 |
| 43 | " | 500 | 0.47 | 0.40 | 6.0 : 1 | 90 | 452 |
| 44 | " | 600 | 0.47 | " | " | 92 | 445 |
| 45 | Example 6 | 350 | 0.40 | 0.25 | 8.0 : 1 | 84 | 390 |
| 46 | " | 400 | 0.43 | " | " | 87 | 394 |
| 47 | " | 450 | 0.46 | 0.20 | 7.0 : 1 | 88 | 400 |
| 48 | " | 550 | 0.47 | " | " | 91 | 390 |
| 49 | Example 7 | 500 | 0.45 | 0.13 | 4.0 : 1 | 88 | 400 |
| 50 | Example 8 | 450 | 0.46 | 0.45 | 8.0 : 1 | 89 | 450 |
| 51 | Example 14 | 350 | 0.46 | 0.65 | 15.0 : 1 | 85 | 420 |
| 52 | " | 400 | 0.45 | 0.65 | 13.0 : 1 | 87 | 478 |

Table 3-continued

| Example | Kind of starting material (Example No.) | Reduction Temperature (°C) | Fe(II)/Fe(III) | Long axis. (μm) | Axial ratio (long axis: short axis) | σs* (emu/g) | Hc* (Oe) |
|---|---|---|---|---|---|---|---|
| 53 | " | 450 | 0.45 | 0.50 | 13.0 : 1 | 88 | 503 |
| 54 | " | 550 | 0.46 | 0.45 | 10.0 : 1 | 88 | 515 |
| 55 | Example 15 | 400 | 0.45 | 0.40 | 13.0 : 1 | 85 | 452 |
| 56 | " | 450 | 0.45 | 0.40 | 13.0 : 1 | 86 | 525 |
| 57 | " | 500 | 0.47 | 0.35 | 10.0 : 1 | 88 | 540 |
| 58 | " | 600 | 0.45 | 0.35 | 10.0 : 1 | 88 | 508 |

\* Hc : Coercive force
\* σs : Saturation magnetization

Table 4

| Example and Comparison Example | Kind of starting material (Example No. and Comparison Example No.) | Reduction temperature (°C) | Fe(II)/Fe(III) | Long axis (μm) | Axial ratio (long axis: short axis) | σs* (emu/g) | Hc (Oe) |
|---|---|---|---|---|---|---|---|
| 59 | Example 9 | 450 | 0.43 | 0.55 | 13.0 : 1 | 85 | 490 |
| 60 | 10 | " | 0.45 | 0.60 | 15.0 : 1 | 86 | 498 |
| 61 | 11 | " | 0.44 | 0.50 | 11.0 : 1 | 88 | 500 |
| 62 | 12 | " | 0.45 | 0.45 | 11.0 : 1 | 88 | 485 |
| 63 | 13 | 400 | 0.43 | 0.60 | 17.0 : 1 | 90 | 490 |
| 64 | 16 | 450 | 0.45 | 0.50 | 16.0 : 1 | 87 | 483 |
| 65 | 17 | " | 0.45 | 0.45 | 15.0 : 1 | 89 | 497 |
| 66 | 18 | 400 | 0.43 | 0.35 | 13.0 : 1 | 87 | 485 |
| 67 | 19 | 500 | 0.47 | 0.70 | 13.0 : 1 | 89 | 515 |
| 68 | Example 25 | 350 | 0.45 | 0.60 | 15.0 : 1 | 86 | 415 |
| 69 | " | 400 | 0.44 | 0.60 | 13.0 : 1 | 86 | 465 |
| 70 | " | 450 | 0.45 | 0.50 | 13.0 : 1 | 88 | 495 |
| 71 | " | 550 | 0.47 | 0.45 | 10.0 : 1 | 90 | 500 |
| 72 | Example 26 | 400 | 0.45 | 0.35 | 12.0 : 1 | 85 | 440 |
| 73 | " | 450 | 0.45 | 0.35 | 12.0 : 1 | 87 | 505 |
| 74 | " | 500 | 0.48 | 0.33 | 12.0 : 1 | 89 | 515 |
| 75 | " | 600 | 0.44 | 0.30 | 10.0 : 1 | 88 | 495 |
| 76 | Example 20 | 450 | 0.44 | 0.50 | 12.0 : 1 | 87 | 485 |
| 77 | 21 | " | 0.45 | 0.65 | 14.0 : 1 | 86 | 490 |
| 78 | 22 | " | 0.46 | 0.50 | 12.0 : 1 | 89 | 487 |
| 79 | 23 | " | 0.46 | 0.40 | 10.0 : 1 | 88 | 480 |
| 80 | 24 | 400 | 0.45 | 0.60 | 18.0 : 1 | 89 | 485 |
| 81 | 27 | 450 | 0.44 | 0.55 | 15.0 : 1 | 87 | 473 |
| 82 | 28 | " | 0.45 | 0.50 | 15.0 : 1 | 88 | 485 |
| 83 | 29 | 400 | 0.45 | 0.30 | 13.0 : 1 | 86 | 468 |
| 84 | 30 | 500 | 0.48 | 0.70 | 13.0 : 1 | 90 | 500 |
| Comparison Example 11 | Comparison Example 1 | 350 | 0.26 | 0.30 | 6.0 : 1 | 89 | 390 |
| 13 | 4 | 350 | 0.25 | 0.50 | 8.0 : 1 | 86 | 385 |

\* Hc : Coercive force
\* σs : Saturation magnetization

Table 5

| Example | Kind of acicular magnetite powder (Example No.) | Long axis (μm) | Axial ratio (long axis: short axis) | Saturation magnetization (σs) (emu/g) | Coercive force (Hc) (Oe) |
|---|---|---|---|---|---|
| Example 85 | Example 32 | 0.35 | 8.0 : 1 | 81 | 398 |
| 86 | 37 | 0.35 | 6.0 : 1 | 80 | 416 |
| 87 | 39 | 0.40 | 7.0 : 1 | 80 | 420 |
| 88 | 40 | 0.10 | 7.0 : 1 | 76 | 350 |
| 89 | 43 | 0.40 | 4.0 : 1 | 80 | 415 |
| 90 | 46 | 0.25 | 6.0 : 1 | 79 | 365 |
| 91 | 49 | 0.13 | 8.0 : 1 | 77 | 350 |
| 92 | 50 | 0.45 | 4.0 : 1 | 81 | 424 |
| 93 | 52 | 0.65 | 13.0 : 1 | 80 | 440 |
| 94 | 57 | 0.35 | 10.0 : 1 | 79 | 500 |
| 95 | 59 | 0.55 | 13.0 : 1 | 81 | 460 |
| 96 | 60 | 0.60 | 15.0 : 1 | 81 | 465 |
| 97 | 61 | 0.50 | 11.0 : 1 | 79 | 465 |
| 98 | 62 | 0.45 | 11.0 : 1 | 79 | 458 |
| 99 | 63 | 0.60 | 17.0 : 1 | 81 | 463 |
| 100 | 64 | 0.50 | 16.0 : 1 | 81 | 447 |
| 101 | 65 | 0.45 | 15.0 : 1 | 81 | 460 |
| 102 | 66 | 0.35 | 13.0 : 1 | 80 | 444 |
| 103 | 67 | 0.70 | 13.0 : 1 | 81 | 475 |
| 104 | 69 | 0.60 | 13.0 : 1 | 79 | 423 |
| 105 | 74 | 0.33 | 12.0 : 1 | 81 | 476 |
| 106 | 76 | 0.50 | 12.0 : 1 | 80 | 447 |

Table 5-continued

| Example | Kind of acicular magnetite powder (Example No.) | Properties of powder Long axis (μm) | Properties of powder Axial ratio (long axis: short axis) | Magnetic properties Saturation magnetization ($\sigma$s) (emu/g) | Magnetic properties Coercive force (Hc) ($\sigma$e) |
|---|---|---|---|---|---|
| 107 | 77 | 0.65 | 14.0 : 1 | 80 | 453 |
| 108 | 78 | 0.50 | 12.0 : 1 | 78 | 450 |
| 109 | 79 | 0.40 | 10.0 : 1 | 79 | 445 |
| 110 | 80 | 0.60 | 18.0 : 1 | 80 | 450 |
| 111 | 81 | 0.55 | 15.0 : 1 | 81 | 436 |

Table 6

| Example and Comparison Example | Kind of acicular magnetite powder (Example No. and Comparison No.) | Properties of powder Long axis (μm) | Properties of powder Axial ratio (long axis: short axis) | Magnetic properties Saturation magnetization ($\sigma$s) (emu/g) | Magnetic properties Coercive force (Hc) ($\sigma$e) |
|---|---|---|---|---|---|
| Example 112 | Example 82 | 0.50 | 15.0 : 1 | 81 | 448 |
| 113 | 83 | 0.30 | 13.0 : 1 | 79 | 432 |
| 114 | 84 | 0.70 | 13.0 : 1 | 80 | 463 |
| Comparison Example 14 | Comparison Example 11 | 0.30 | 6.0 : 1 | 80 | 340 |
| 15 | 13 | 0.50 | 8.0 : 1 | 78 | 340 |

Table 7

| Example and Comparison Example | Kind of magnetic powder (Example No. and Comparison Example No.) | Coercive force (Hc) (Oe) | Residual magnetic flux (Br) (Gauss) | Rectangular (Br/Bm) |
|---|---|---|---|---|
| Example 115 | Example 32 | 380 | 1380 | 0.86 |
| 116 | 37 | 395 | 1400 | 0.85 |
| 117 | 43 | 390 | 1415 | 0.87 |
| 118 | 46 | 330 | 1350 | 0.84 |
| 119 | 53 | 458 | 1440 | 0.86 |
| 120 | 59 | 452 | 1450 | 0.87 |
| 121 | 62 | 465 | 1465 | 0.88 |
| 122 | 70 | 448 | 1410 | 0.85 |
| 123 | 76 | 443 | 1425 | 0.86 |
| 124 | 79 | 450 | 1440 | 0.86 |
| 125 | 87 | 382 | 1400 | 0.88 |
| 126 | 89 | 368 | 1420 | 0.86 |
| 127 | 92 | 375 | 1415 | 0.88 |
| 128 | 95 | 420 | 1488 | 0.91 |
| 129 | 97 | 415 | 1475 | 0.91 |
| 130 | 100 | 395 | 1460 | 0.88 |
| 131 | 106 | 415 | 1455 | 0.92 |
| 132 | 108 | 410 | 1445 | 0.90 |
| 133 | 111 | 388 | 1430 | 0.89 |
| Comparison Example 17 | Comparison Example 11 | 315 | 1100 | 0.77 |
| 18 | 15 | 320 | 1100 | 0.76 |

What is claimed is:

1. In the production of acicular ferromagnetic iron oxide of highly uniform particle size by oxidizing an iron (II) hydroxide suspension at a pH of at least 11 with an oxygen-containing gas to form acicular iron (III) oxide hydroxide, and reducing said acicular iron (III) oxide hydroxide into ferromagnetic iron oxide, the improvement which comprises:

prior to the oxidation of said suspension with said oxygen-containing gas, providing said iron (II) hydroxide suspension with a water-soluble silicate in an amount of 0.1–1.7 atomic % based on the amount of the iron (II) hydroxide in the suspension and calculated as the ratio of Si to Fe (II).

2. The process of claim 1, wherein said ferromagnetic iron oxide produced by reducing said iron (III) oxide hydroxide is further oxidized into ferromagnetic iron (III) oxide.

3. The process of claim 1, in which the amount of water-soluble silicate contained in the iron (II) hydroxide suspension is in the range of 0.1 to 1.7 atomic % based on the amount of iron (II) hydroxide in the suspension and calculated as the ratio of Si to Fe (II).

4. The process of claim 3, in which the reduction of the acicular iron (III) oxide hydroxide is carried out in a reducing gas at a temperature between 300° and 600° C.

5. The process of claim 4, in which the reduction temperature of the acicular iron (III) oxide hydroxide is in the range of 400° to 550° C.

6. The process of claim 1, in which the iron (II) hydroxide suspension is prepared by precipitating iron (II) hydroxide from an aqueous iron (II) salt solution by addition of an aqueous alkaline solution containing water-soluble silicate in an amount between 0.1 and 1.7 atomic % based on the amount of the iron (II) hydroxide in the suspension to be formed and calculated as the ratio of Si to Fe (II).

7. The process of claim 6, in which the reduction of the acicular iron (III) oxide hydroxide is carried out in a reducing gas at a temperature between 300° and 600° C.

8. The process of claim 7, in which the reduction temperature of the acicular iron (III) oxide hydroxide is in the range of 400° to 550° C.

9. In the production of acicular ferromagnetic iron oxide of highly uniform particle size and large length-to-width ratio by oxidizing an iron (II) hydroxide suspension at a pH of at least 11 with an oxygen-containing gas to form acicular iron (III) oxide hydroxide, and reducing said acicular iron (III) oxide hydroxide into ferromagnetic iron oxide, the improvement which comprises:

prior to the oxidation of said suspension with said oxygen-containing gas, providing said iron (II) hydroxide suspension with a water-soluble silicate and zinc compound in amounts between 0.1–1.7 atomic % and 0.1–2.3 atomic % based on the amount of the iron (II) hydroxide in the suspension and calculated as the ratio of Si or Zn to Fe (II) respectively, the ratio of Si plus Zn to Fe (II) being in the range of 0.3–2.5 atomic %.

10. The process of claim 9, in which the ratios of Si to Fe (II) and Zn to Fe (II) are in the ranges of 0.3–0.7 atomic % and 1.0–2.0 atomic % respectively, the ratio of Si plus Zn to Fe (II) is in the range of 1.0–2.5 atomic %.

11. The process of claim 9, wherein said ferromagnetic iron oxide produced by reducing said iron (III) oxide hydroxide is further oxidized into ferromagnetic iron (III) oxide.

12. The process of claim 9, in which the reduction of the acicular iron (III) oxide hydroxide is carried out in a reducing gas at a temperature between 300° and 600° C.

13. The process of claim 12, in which the reduction temperature of the acicular iron (III) oxide hydroxide is in the range of 400° to 550° C.

14. The process of claim 9, in which the iron (II) hydroxide suspension is prepared by precipitating iron (II) hydroxide from an aqueous iron (II) salt solution by addition of an aqueous alkaline solution containing water-soluble silicate in an amount between 0.1 and 1.7 atomic % based on the amount of the iron (II) hydroxide in the suspension to be formed and calculated as the ratio of Si to Fe (II).

15. The process of claim 14, in which the ratios of Si to Fe (II) and Zn to Fe (II) are in the ranges of 0.3–0.7 atomic % and 1.0–2.0 atomic % respectively, while the ratio of Si plus Zn to Fe (II) is in the range of 1.0–2.5 atomic %.

16. The process of claim 15, in which the reduction of the acicular iron (III) oxide hydroxide is carried out in a reducing gas at a temperature between 300° and 600° C.

17. The process of claim 16, in which the reduction temperature of the acicular iron (III) oxide hydroxide is in the range of 400° to 550° C.

* * * * *